(12) United States Patent
Elliot et al.

(10) Patent No.: US 8,351,081 B2
(45) Date of Patent: Jan. 8, 2013

(54) DIGITAL PRINTING CONTROL USING A SPECTROPHOTOMETER

(75) Inventors: Jack Gaynor Elliot, Penfield, NY (US); Lalit Keshav Mestha, Fairport, NY (US); Peter Paul, Webster, NY (US); David C. Craig, Pittsford, NY (US); Brian Robert Conrow, Webster, NY (US); Christine Ann Steurrys, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 378 days.

(21) Appl. No.: 12/839,620

(22) Filed: Jul. 20, 2010

(65) Prior Publication Data

US 2012/0019842 A1  Jan. 26, 2012

(51) Int. Cl.
*G06F 15/00* (2006.01)

(52) U.S. Cl. ........... 358/1.9; 358/1.1; 358/2.1; 358/502; 399/299

(58) Field of Classification Search .................. 358/1.9
See application file for complete search history.

(56) References Cited

U.S. PATENT DOCUMENTS

| 7,283,143 | B2 | 10/2007 | Mizes et al. |
| 2002/0051919 | A1 | 5/2002 | Berkes |
| 2003/0021615 | A1 | 1/2003 | Asano et al. |
| 2006/0227395 | A1 | 10/2006 | Mestha et al. |
| 2006/0244980 | A1 | 11/2006 | Grace |
| 2009/0296154 | A1 | 12/2009 | Donaldson et al. |

OTHER PUBLICATIONS

U.S. Appl. No. 12/352,350, filed Jan. 12, 2009, Mestha et al.

*Primary Examiner* — Marivelisse Santiago Cordero
*Assistant Examiner* — Moustapha Diaby
(74) *Attorney, Agent, or Firm* — Philip E. Blair; Fleit Gibbons Gutman Bongini & Bianco P.L.

(57) ABSTRACT

What is disclosed is a novel system and method for xerographic Dmax control based upon measurements made on the printed paper using an inline spectrophotometer (ILS) or similar device. The disclosed method is based upon directly measuring the color to actuator sensitivity. Each of the separations is controlled independently using an actuator specific to that color separation. The present method is effective at controlling the color of the solid primaries. The fact that the vector of change is highly correlated with solid color variation seen in the field suggests that the teachings hereof effectively increase the solid color stability. Increased solid color stability increases the color stability throughout the printer gamut and the stability of the gamut boundaries, which increases the robustness of gamut mapping algorithms. Advantageously, the present method can be combined with existing ILS-based maintenance architectures.

24 Claims, 6 Drawing Sheets

DIGITAL PRINTING CONTROL USING A SPECTROPHOTOMETER

TECHNICAL FIELD

The present invention is directed to systems and methods for xerographic Dmax control based upon measurements of color test patches made on paper using an in-line spectrophotometer (ILS) or similar color measurement device.

BACKGROUND

In current production printers, the solid color of each separation (primary) is controlled based on the achievement of a nominal DMA (developed mass per unit area) as measured on the photoreceptor (usually a belt or drum). Typically, reflectance measurements are made using an optical sensor, e.g., an ETAC (enhanced toner area coverage) densitometer, to infer DMA via a model relating the two, i.e., mass as a function of reflectance and a target DMA is determined by substituting the nominal DMA into this model. Then, while printing, measuring the reflectance of patches in the inter-document zone, xerographic process control loops adjust the xerographic actuators such that the reflectance tracks the target value. Examples of common xerographic actuators include ROS (raster output scanner) exposure, the photoreceptor voltages (charged and/or discharged voltage), donor and/or magnetic roll voltages, and toner concentration. Although functional, this type of process control system, presently used on iGen3 and iGen4 systems, is subject to color variation due to variation in the environment, media, sensors, xerographic processes, operating conditions, downstream effects from transfer & fusing, etc.

Accordingly, what is needed in this art are increasingly sophisticated systems and methods for xerographic Dmax control which is based upon measurements using an inline spectrophotometer (ILS) or similar device to increase color stability and gamut mapping robustness.

INCORPORATED REFERENCES

The following U.S. patents, U.S. patent applications, and Publications are incorporated herein in their entirety by reference "Systems And Methods For Printing Images Outside A Normal Color Gamut In Image Forming Devices", U.S. Publication No. 20060227395, to Mestha et al.

"Controlling Process Color In A Color Adjustment System", U.S. patent application Ser. No. 12/536,600, to Mestha et al.

BRIEF SUMMARY

What is disclosed is a novel system and method for xerographic Dmax control based upon measurements made on the printed paper using an inline spectrophotometer (ILS) or similar device. The intention hereof is to provide an algorithm to calibrate a print engine's color at the solid area level and regulate it during runtime. This is particularly important since digital area coverage fundamentally cannot compensate for a solid too light condition and it has been experimentally verified that the color response to digital area coverage can be significantly different than that of mass (at least in the area coverage range of ~60% to 100%). For the Cyan and Magenta toners used in iGen3 and iGen4, the response to area coverage is almost orthogonal to mass at the solid area level. Black also has some difference in effects at the solid area level. Yellow has very little. The difference between area coverage and mass effects is primarily due to unwanted absorptions, which the iGen3 and iGen4 Cyan and Magenta toners are known to have. The disclosed method is based upon directly measuring the color to actuator sensitivity, and each of the separations is controlled independently using an actuator specific to that color separation. The method sets the actuator to two set points about a nominal setting. The nominal setting would typically be the last relevant operating point. From the resultant data collected at the three points (nominal plus two) a line or curve is fitted and the actuator set point determined that brings the system closest to a L*a*b* target. The present method is effective at controlling the color of the solid primaries. The fact that the vector of change is highly correlated with solid color variation seen in the field suggests that the teachings hereof effectively increase the solid color stability. Increased solid color stability increases the color stability throughout the printer gamut and the stability of the gamut boundaries, which increases the robustness of gamut mapping algorithms. Advantageously, the present method can be combined with existing ILS-based maintenance architectures.

In one example embodiment, the present method for calibration of a marking device's output color as measured on a media substrate at the solid area level involves performing the following. For each of a given color separation in an n-separation color marking device, a target color parameter vector is selected at the solid area level comprising a point in color parameter space. A solid area patch is printed on a substrate using the color marking device. The device has at least one adjustable actuator per color separation which regulates an amount of colorant deposited on a substrate at the solid area level. The actuator has been previously set to a nominal operating point. The printed solid area patch is measured on a substrate to obtain a nominal measured color parameter vector. A distance is measured between the nominal parameter vector and the target color parameter vector via a Euclidean metric. If this distance is greater than a predefined threshold then, for at least one iteration, the following is repeated. The actuator is set to a new operating point. The solid area patch is then printed using the marking device and the printed patches are measured to obtain a measured color parameter vector associated with the new actuator operating point. A functional relationship is determined between a predicted printed color parameter vector and a corresponding new actuator operating point. Then, using the functional relationship, a final (or optimal) actuator operating point is determined which minimizes a distance between the predicted printed color parameter vector and the target color parameter vector. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
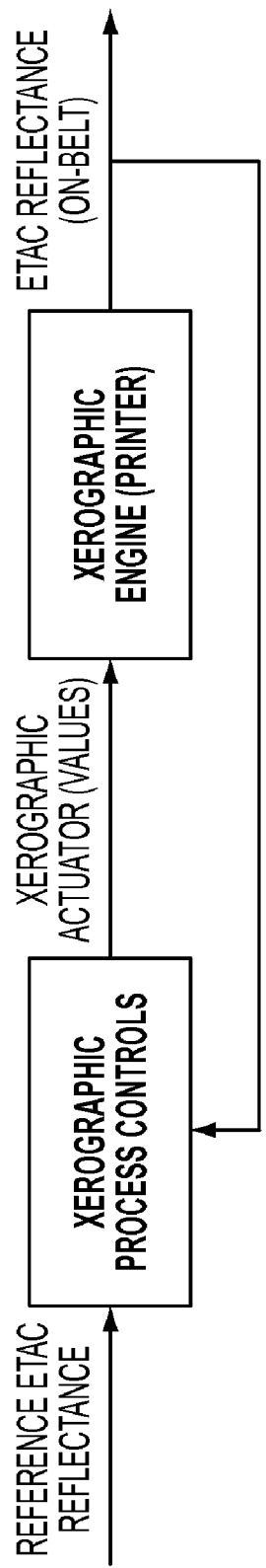
FIG. 1 is a block diagram illustrating one embodiment of the present method using a mass-based xerographic process control loop (during runtime)

What is disclosed is novel system and method for in-line spectrophotometer (ILS) xerographic Dmax control algorithm for calibration of a n-separation marking device's output color as measured on a media substrate at the solid area level. The fact that the vector of change is highly correlated with solid color variation suggests that the teachings hereof increase the solid color stability which increases the color stability throughout the printer gamut and the stability of the gamut boundaries. This, in turn, increases the robustness of gamut mapping methods employed. Further, if combined with existing ILS-based maintenance routines, additional measurements (prints) are not required.

It should be understood that one of ordinary skill in this art would be readily familiar with many facets of color science and image processing and other techniques and algorithms commonly found in the color science and xerographic arts. Those of ordinary skill would be familiar with the text: "Digital Color Imaging Handbook", 1st Ed., CRC Press (2003), ISBN-13: 97808-4930-9007, and "Control of Color Imaging Systems: Analysis and Design", CRC Press (2009), ISBN-13: 97808-4933-7468, both of which are incorporated herein in their entirety by reference.

Non-Limiting Definitions

A "color parameter space" is any standard color space that is commonly used to define or describe color, e.g. CIE XYZ, CIE L*a*b*, CIE L*u*v*, sRGB etc.

A "device-dependent color space" is a color space that is non-standard and cannot be used to commonly define colors without additional information such as the characteristics of the rendering device.

A "single separation color" refers to a color specified with only one of the color separations for a target marking system. For example, for a CMYK printer, a C-only test patch is a single-separation color patch.

A "multi-separation color" refers to a color specified with more than one of the color separations for a target marking system. For example, for a CMYK printer, a red test color is a multi-separation color test patch, using combinations of M and Y separations at some pre-determined levels.

A "n-separation marking device" is color marking device or system that is able to generate a color image in multi-separation color using image data or data generated from image data.

A "colorant" refers to the medium used for rendering a particular color separation which, in forming a multi-colored image, is combined with one or more other colorants to achieve image colors throughout the spectrum. Each color separation thus may have its own corresponding colorant.

A "substrate" is a surface upon which toner is deposited using a process that involves one or more actuators. Such surfaces may also take the form of a photoreceptor belt or drum on which charged toner particles are deposited to form an image. Toner particles are charged triboelectrically, in either a single component development process or a two-component development process.

A "media substrate" is a substrate, such as paper or transparency film, that is used as a final output surface for an image.

An "actuator" is a controller or device element such as, for example, a corotron or scorotron wire voltage or a scorotron grid voltage ROS power, or development bias voltage, which is adjustable such that a measurement received from an ESV (electrostatic voltmeter), ETAC, densitometer, colorimeter, or spectrophotometer, is driven toward a voltage target value or set point. Adjusting an actuator setting or otherwise changing the actuator's operating point, darkens or lightens an image by controlling the amount of toner deposited on the surface of a media substrate.

A "reflectance sensing device", is to a device capable of measuring an amount of light reflected from a sample. A reflectance sensing device can be any of: a full width sensing array, a spectrophotometer, a colorimeter, or a densitometer.

A "spectrophotometer" is a reflectance sensing device which measures the reflectance over many wavelengths and provides distinct electrical signals corresponding to the different levels of reflected light received from the respective different illumination wavelength ranges using multiple channels.

A "colorimeter" is a reflectance sensing device which typically has three illumination channels and which provides output color values in the trichromatic quantity known as RGB, (red, green, blue) as read by a sensor receiving reflected light from a surface.

A "densitometer" is another reflectance sensing device which typically only has a single channel and simply measures the amplitude of light reflectivity from the test surface, such as a developed toner test patch on a photoreceptor, at a selected angle over a range of wavelengths, which may be wide or narrow. The output of the densitometer is the optical density of the test sample.

A "target color parameter vector" defines a point of desired color in a color parameter space by a set of coordinates. If the color parameter space is the L*a*b* space, for example, a target color $x_c$ has a color parameter vector with coordinates $\{L^*_c, a^*_c, b^*_c\}$.

A "nominal color parameter vector" defines a color in a color parameter space obtained from measuring a solid area patch printed on a substrate using the color marking device with an actuator for this color separation set to a nominal operating point.

A "measured color parameter vector" defines a color in color parameter space obtained from measuring, using a reflectance sensing device, a solid area patch printed using an actuator operating point for this color separation.

"Solid area level" describes a setting or an amount of area coverage to a maximum reasonable density, given the properties of the printer hardware under expected conditions. Printing at the solid area level involves transferring a continuous amount of colorant to all locations within that area of the substrate. In a digital printer that uses halftoning, for instance, the solid area level is 100% area coverage, where all the halftone dots are completely filled in. In the halftone world, the 'solid area' is synonymous with 100% area coverage.

To "converge the xerographics" means to allow the print device or print system to adjust to changes made by the device actuators in response to the various determinations made herein further. A xerographic device is intended to refer to any system or device capable of receiving a signal of a color image and reducing that signal to a viewable form.

General Discussion

What is presented is a xerographic Dmax control method. The maximum printable density (Dmax) and resulting solid color of production printers (e.g., iGen3/iGen4) is currently setup using on-belt (photoreceptor) mass measurements for each separation rather than on-paper color measurements. Xerographic process control loops operate on each separation to maintain the Dmax on the photoreceptor at nominal targets, using xerographic actuators like ROS exposure and the development field to control each separation. However, as discussed in the background section, due to variation in the environment, media, sensors, xerographic processes, operating conditions, downstream effects from transfer & fusing, and the like, the color of a particular machine can have large variation throughout its gamut and even in the shadow regions regardless of how well the mass of individual separations is controlled on the photoreceptor. Such color variation can lead to color stability issues and may compromise the effectiveness of gamut mapping. Directly measuring the color increases color stability and gamut mapping robustness when compared with on-belt measurement methods. Measurements made on the photoreceptor using an ETAC or similar device can be optimized based upon measurements made on the printed paper using an inline spectrophotometer (ILS) or similar device. As with current mass-based methods, the present method comprises a setup routine that can be performed while the device or system is offline. To stabilize the color during runtime, a current mass-based approach (of FIG. 1) is employed. Control loops operate on each color separation to maintain the reference value established by the ILS xerographic Dmax control algorithm.

One primary embodiment is presented which is based upon direct measurements of color-to-actuator sensitivity (gradient). Each of the color separations is controlled independently using an actuator specific to that separation. The algorithm involves measuring the color in L*a*b* space with the actuator(s) set low and high, e.g., −20% and +20% of a nominal operating point. A fitted line or curve is then constructed between these measured points. The optimal actuator operating point is a point on the line which, when combined with the target color point, creates a line orthogonal (normal) to the fitted line or curve. A linear fit, as discussed in greater detail, can include a center (or nominal) point. Since some existing color maintenance tools already measure a nominal point during basic routines, this approach to ILS Xerographic Dmax Control may be implemented with no additional measurements (prints). Note that one could also use spectral reflectance or spectra for control in place of L*a*b* color measurements. Spectra may be attractive by making the color space more linear and more accurately represented with a linear model. Various embodiments setup the solid color of each of the single separations (primaries) independently using a single actuator, which may be a xerographic actuator or a control set point.

Figure 2:
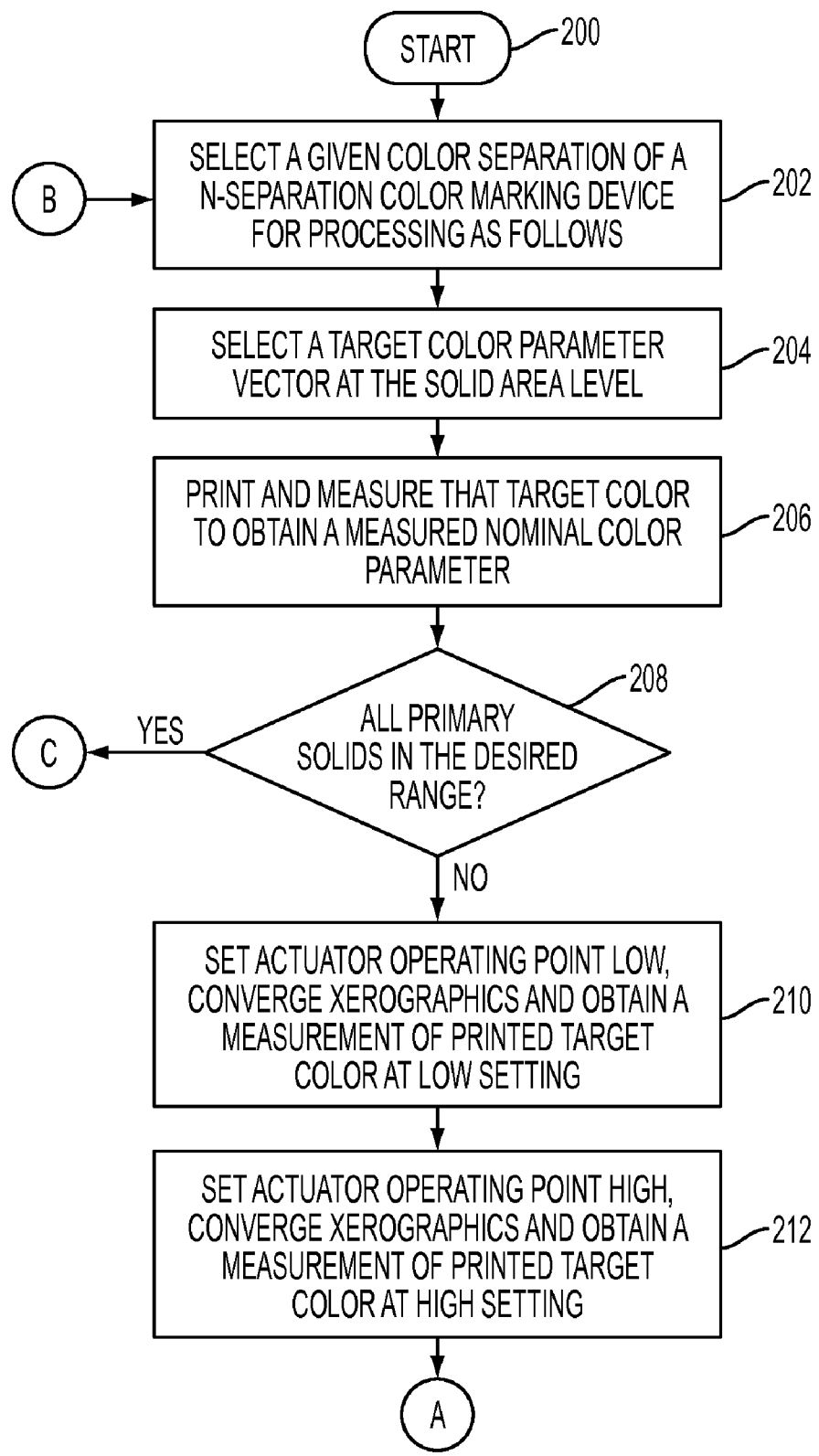
FIG. 2 is a flow diagram of one example embodiment of the present method for determining an optimal actuator setting based upon direct measurements of color-to-actuator sensitivity (gradient)
Figure 3:
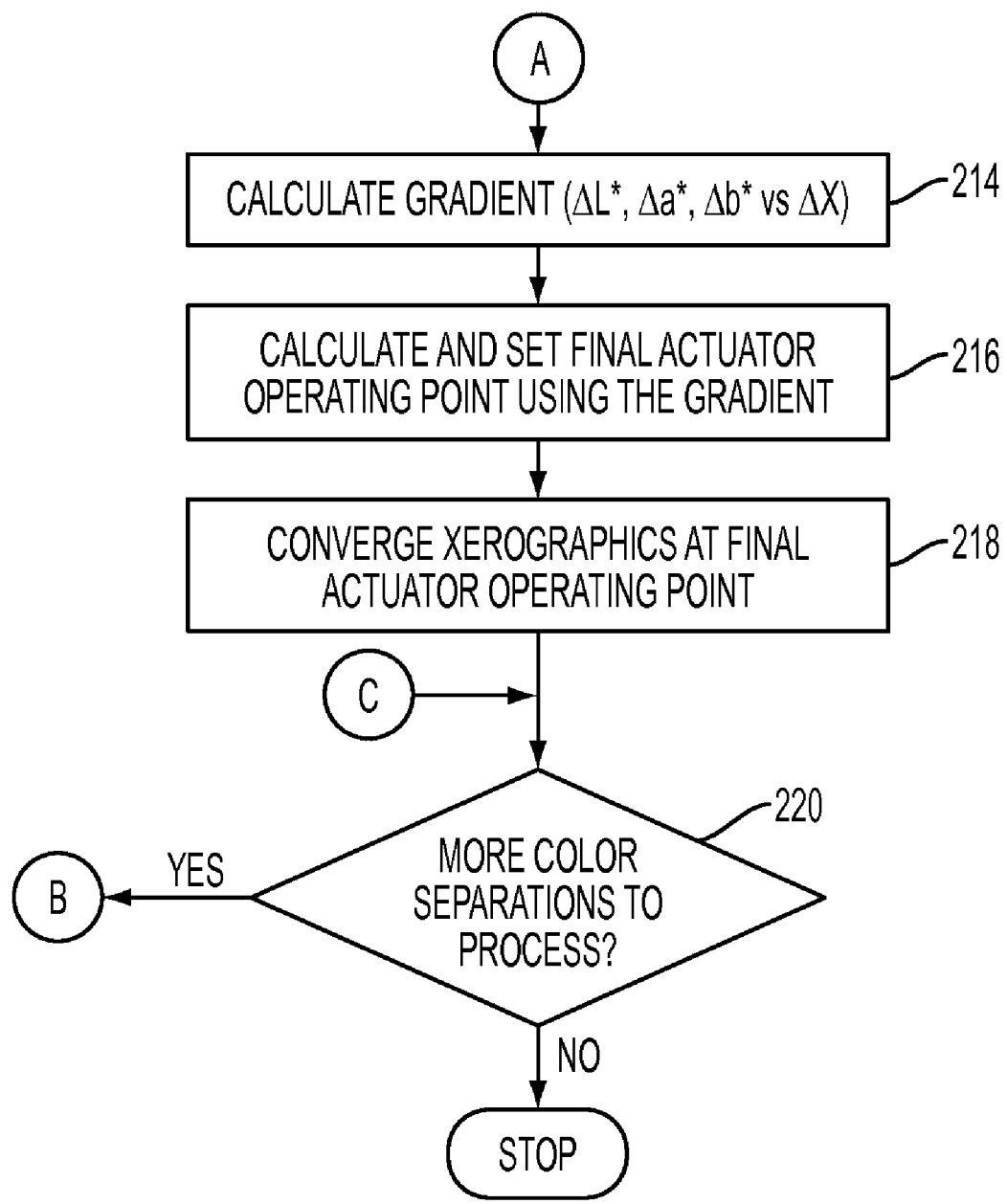
FIG. 3 is a continuation of the flow diagram of FIG. 2 with flow processing continuing with respect to node A.
Figure 4:
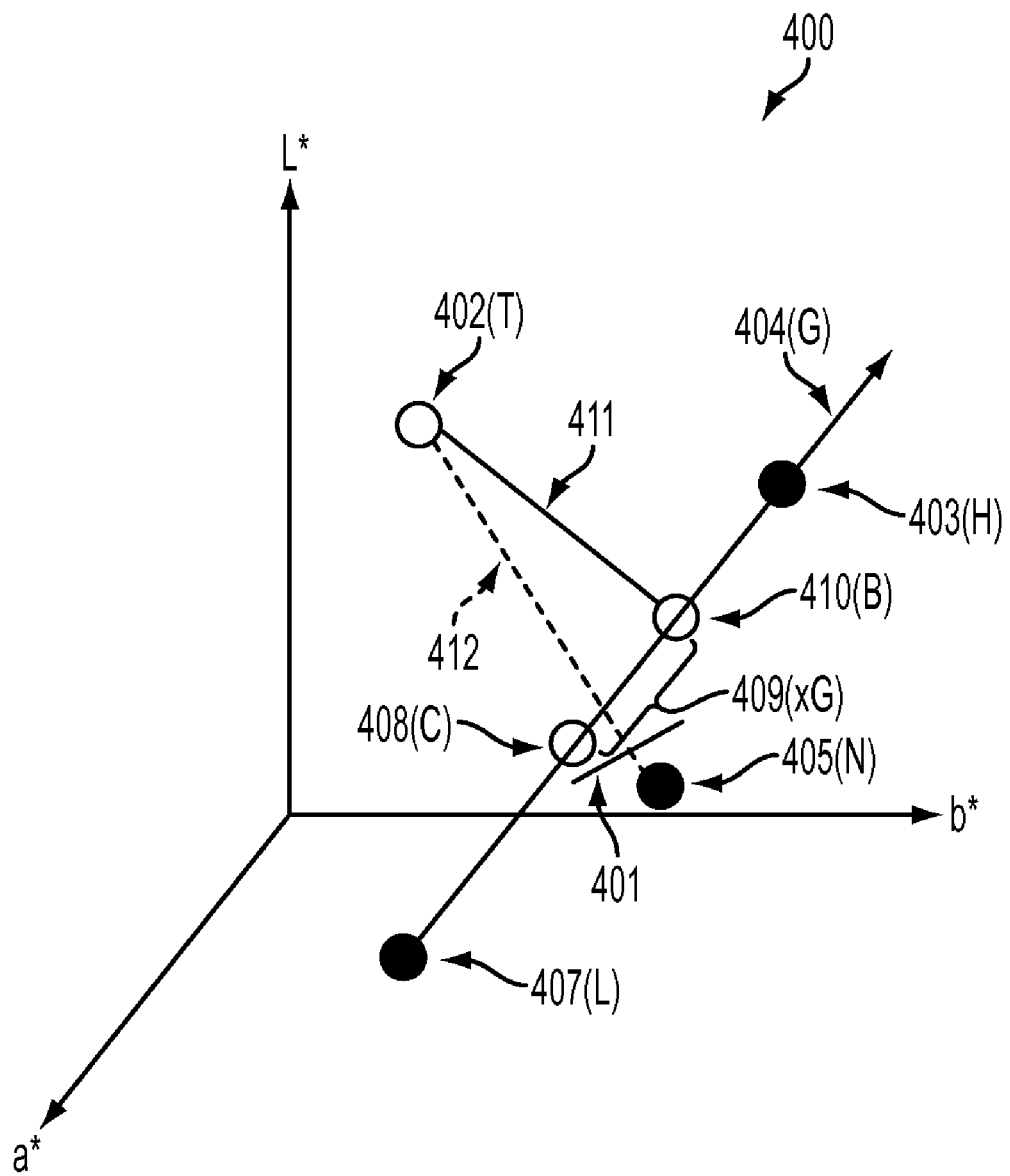
FIG. 4 is an illustration which helps explain various aspects of determining an optimal actuator setting from a gradient as described with respect to the flow diagrams of FIGS. 2 and 3.

Reference is now being made to the flow diagrams of FIGS. 2 and 3, which illustrates one example embodiment of the present method for determining an optimal actuator operating point based upon direct measurements of color-to-actuator sensitivity (gradient). Processing begins at 200 and immediately proceeds to step 202. Various aspects of this embodiment are discussed in conjunction with L*a*b* color space 400 of FIG. 4.

At step 202, a first color separation of an n-separation marking device is selected for processing. The marking device has at least one adjustable actuator-per-color separation which regulates an amount of colorant deposited on a substrate at the solid area level. The one or more actuators operable for this color separation have been previously set to a nominal operating point. Such an operating point can readily be determined by one of ordinary skill in this art.

At step 204, a target color parameter vector T is selected at the solid area level. The target color parameter vector comprises a point in color parameter space. One example target color parameter vector T is shown at 402(T). It should be appreciated that each of the color points of FIG. 4 comprises a vector which extends from the origin of the L*a*b* color space 400.

At step 206, a solid area patch containing the target color is printed on a substrate using the marking device and the printed patch is measured using a reflectance sensing device to obtain a nominal measured color parameter vector N. Measurements of printed test patches are readily made by a reflectance sensing device such as an in-line spectrophotometer (ILS), for instance. One example nominal color parameter vector N is shown at 405(N). The measurement readings (and controls determined thereby) can be in-line, off-line, or manually obtained using, for example, a hand-held reflectance sensing device.

At step 208, a determination is made whether all primary solids are in a desired range. The desired range is shown by way of example threshold 401. This determination is made using a metric for calculating an amount of a color difference between the nominal measured color parameter vector N and the target color parameter vector T. This color difference (or distance), as shown by way of example at 412, can be Euclidean, deltaE2000, or any other equivalent color distance metric CIECAM02. Generally, a Euclidean distance between two colors in, for example, L*a*b* space, having coordinates expressed in terms of $\{L^*, a^*, b^*\}$, is given by:

$$\Delta E^*_{ab} = \sqrt{(\Delta L^*)^2 + (\Delta a^*)^2 + (\Delta b^*)^2}.$$

In a cylindrical coordinate representation of L*a*b* space, the Euclidean distance between two colors $x_1$ and $x_2$ having coordinates $\{L^*_1, h^*_1, C^*_1\}$ and $\{L^*_2, h^*_2, C^*_2\}$, respectively, is given by:

$$\Delta E^*_{ab} = \sqrt{(\Delta L^*)^2 + C^*_1 + C^*_2 - 2C^*_1 C^*_2 \cos(h^*_2 - h^*_1)}.$$

If the color difference is greater than a predefined threshold then processing proceeds with respect to step 210. Otherwise, processing proceeds with respect to node C of FIG. 3

At step 210, set the actuator to a low operating point $x_L$, converge the xerographics, and obtain a measurement of the target color at this low setting by printing the patch at this low actuator operating point and measuring the patch to obtain a measured low color parameter vector L. One example low color parameter vector L is shown at 407(L).

At step 212, set the actuator to a high operating point $x_H$, converge the xerographics, and obtain a measurement of the target color at this high setting by printing the patch at this high actuator setting and measuring the patch to obtain a measured high color parameter vector H. One example high color parameter vector H is shown at 403(H). The high actuator operating point is higher than the low actuator setting (step 210), but may be the same. Processing continues next with respect to node A of FIG. 3.

Reference is now being made to the flow diagram of FIG. 3, which is a continuation of the flow diagram of FIG. 2 with processing continuing with respect to node A.

At step 214, calculate a gradient $\vec{G}$. One example gradient $\vec{G}$ is shown at 404(G). The gradient hereof is a ratio of color difference, given as: ΔL*, Δa*, Δb*, verses a difference in actuator settings, Δx. In one embodiment, the gradient comprises:

$$\vec{G} = \left[\frac{(H-L)}{(x_H - x_L)}\right], \quad (1)$$

where H is the measured high color parameter vector 403 (H), L is the measured low color parameter vector 407(L), $x_H$ is the actuator operating point at the high level (of step 212), and $x_L$ is the actuator operating point at the low level (of step 210).

At step 216, calculate the optimal actuation operating point. To effectuate this, a point is fitted between the measured low color parameter vector 407(L) and the measured high color parameter vector 403(H). One example point C is shown at 408(C). Point C serves as an origin for determination of the optimal actuation operating point. The point where a line (shown at 411) extending from target color parameter vector 402(T) intersects the line between 407(L) and 403(H) is the optimal (or best) color 410(B). Line 411 is orthogonal to the line at intersection point 410(B). In this embodiment, the best color 410(B) is calculated as follows:

$$B = C + x\vec{G} \quad (2)$$

where C is point 408(C), $\vec{G}$ is gradient 404(G), and x is an offset which, when added to the nominal actuator operating point, produces the optimal actuator operating point (or optimal actuator operating point). The optimal actuator operating point produces best color B. In one embodiment, the offset is defined by the following relationship:

$$x = \frac{\vec{G} \cdot (T - C)}{(\vec{G} \cdot \vec{G})}, \quad (3)$$

where T is the target color 402(T) (of step 204), C is the point 408C, and the symbol '•' represents the dot product. It should be appreciated that the offset (of Eq. 3) constitutes an amount of a distance from point 408(C) in the direction of gradient $\vec{G}$, as shown by way of example at 409($x\vec{G}$), to achieve best color B. The marking device is set to this actuator operating point.

At step 218, converge the xerographics at this actuation operating point.

At step 220, a determination is made whether any more color separations for this n-separation device are intended to be processed. If so, then processing repeats with respect to node B which returns to step 202 of FIG. 2 wherein a next color separation is selected for processing. Processing repeats in such a manner until all color separations for the color marking device have been processed accordingly. Thereafter, processing stops.

Figure 5:
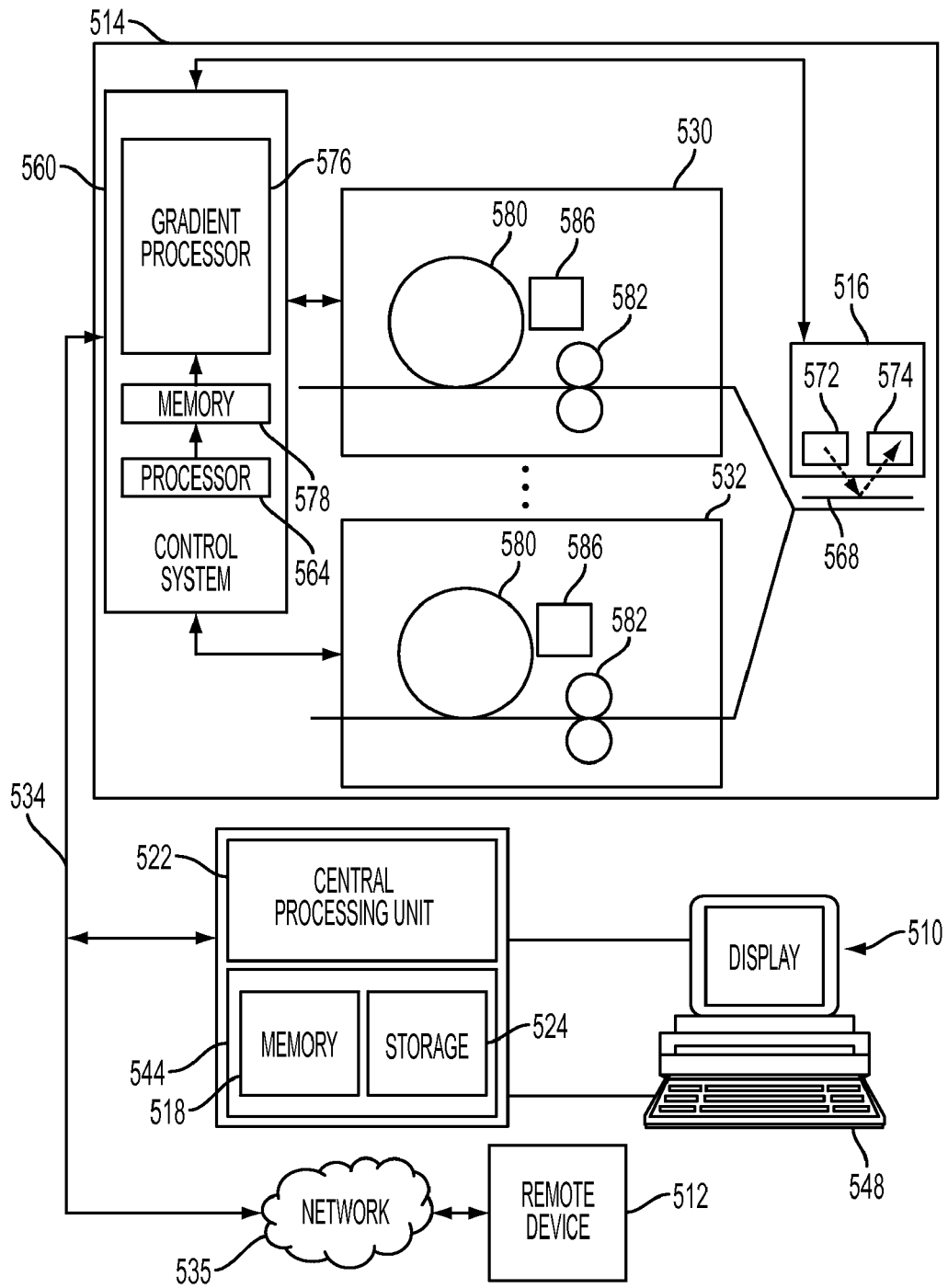
FIG. 5 shows functional block diagram of a color marking device arrayed in a networked configuration capable of color reproduction in n-separations, wherein various aspects of the present method as described above.

Reference is now being made to the system of FIG. 5 which shows functional block diagram of a color marking device arrayed in a networked configuration capable of color reproduction in n-separations, wherein various aspects of the present method as described above.

In the illustrated printing system of FIG. 5, a plurality of color marking engines 530 and 532 are incorporated into system 514 shown connected to network 535 via communication bus 534. Each of the marking engines are selectable for printing image data received from computer system 510 or from a remote device, shown generally at 512. One or more of the plurality of marking engines may be associated with separate printer systems. Although only 2 marking engines are illustrated, it should be appreciated that the illustrated system has n-marking engines where n>2.

Marking devices 530, 532 comprise any suitable device for applying images to print media, such as xerographic marking devices, inkjet marking devices, or the like. The marking device includes many of the hardware elements employed in the creation of desired images by electro-photographical processes. The marking devices are shown having a charge retentive surface, such as a rotating photoreceptor in the form of a belt or drum, either at 580. The images are created on a surface of the photoreceptor. Disposed at various points around the circumference of the photoreceptor are xerographic subsystems which include a cleaning device, a charging station for each of the colors to be applied (one in the case of a monochrome marking device, four in the case of a CMYK marking device), such as a charging corotron, an exposure station, which forms a latent image on the photoreceptor, a developer unit, associated with each charging station for developing the latent image formed on the surface of the photoreceptor by applying a toner to obtain a toner image, a transferring unit, such as a transfer corotron, transfers the toner image thus formed to the surface of a print media substrate, such as a sheet of paper, and a fuser 582, which fuses the image to the sheet. The fuser generally applies at least one of heat and pressure to the sheet to physically attach the toner and optionally to provide a level of gloss to the printed media. While both illustrated marking engines 530, 532 may be similarly configured, it is also contemplated that the making devices may differ in one or more respects. The marking engines include on-belt sensor 586. Marking engines 530 and 532 can include any device for rendering an image on print media. The marking devices may be single colorant (monochrome, e.g., black) marking devices or multiple colorant (color) marking devices, such as CMYK devices. The image rendering device 514 incorporating the plurality of marking engines can be a copier, laser printer, bookmaking machine, facsimile machine, or a multifunction machine. An image to be printed generally includes information in electronic form which is to be rendered on the print media by the image forming device and may include text, graphics, pictures, and the like. The operation of applying images to print media, for example, graphics, text, photographs, etc., is generally referred to herein as printing or marking. As is known in this art, the operation of printing involves mapping colorant values to device-dependent colorant values.

Spectrophotometer 516 captures image data from example test patch 568 and provides color image measurements to ILS Dmax Control System 560 either directly or via an intermediate processing component. On-paper sensor 516 includes a light source 572, such as an LED bar or other light source which directs light to onto the image 568 and further includes a detector 574 which detects reflected light. Spectrophotometer 516 includes one or two substantially linear elongated arrays of closely spaced multiple LED illumination sources transversely spanning the paper path and which are sequentially illuminated to illuminate a transverse band across a printed sheet moving in the paper path, and a corresponding array of multiple closely spaced different color sensitive photodetectors, which are positioned to detect and analyze light reflected from the sheet. Sensor 516 may further be configured to measure optical density. In addition to receiving information from sensor 516, color image measurements are received by control system 560 from on-belt sensor 586. Virtual sensors may be further be used to supplement the information obtained by sensor 516 or on-belt sensor 586. In one embodiment, on-belt sensor 586 and on-paper sensor 516 comprise a full width array (FWA) which generates digitized image data for each scanline. It should be appreciated that the on-belt sensor 586 and/or on-paper sensor 516 can be an in-line sensor, such as one which is located within the printer for example, in an output tray, or, alternatively, may be a stand-alone device or incorporated into, for example, a dedicated scanner and diagnostic system. Each marking device may be associated with its own dedicated sensor. While the sensor 516 may detect values of multiple colorants it may detect only a single colorant or may detect luminosity of the image. The sensor may include a gloss meter which measures the specular reflection of the image. On-belt sensor 586 and/or on-paper sensor 516 may transmit data after completing all the measurements from multiple sheets. Alternatively, the on-belt and/or on-paper sensor transmits data during or after the marking of each sheet either via a wired or wireless connection.

ILS Dmax Control System 560 is in communication with sensor 516 and each of the plurality of marking engines 530, 532 and any of the components contained therein. Control System 560 is also in communication with workstation 510 via communication bus 534 and also remote device 512 via network 535. ILS Dmax Control System performs the present method, as described above. The control system includes a gradient processor 576, a memory 578 and a processor 564. Memory 578 is intended to represent any type of machine readable medium such as RAM, ROM, magnetic disk or tape, optical disk, flash, holographic, and the like. In one embodiment, memory 578 comprises a combination of RAM and ROM. In various embodiments, actuator control system 560 is a special purpose computer system as discussed herein further with respect to FIG. 6. In the illustrated embodiment, the gradient processor 576 obtains receives color measurements and target colors and calculates an optimal actuator operating point, as described above in various embodiments, which minimizes a distance between the predicted printed color parameter vector and the target color parameter vector.

Control system 560 may further convert received color image signals into a suitable form for rendering and may further functionality for monitoring a performance of the marking devices. The control system may include a print model generator which processes information received directly or indirectly from device 530, 532, including acquired image data from sensor 516. Control system 560 may also utilize information for real-time modifying of colors to be printed of jobs submitted to the marking engines, or this functionality may be performed by a separate processing component. Control system 560 also includes a test image generator which generates image data for a test pattern. The test pattern may include one or more color test patches.

ILS Dmax Control System 560 may further incorporate special hardware and/or software for performing commonly known image processing techniques such as, for example, Fourier transform analysis, histogramming, defect detection and the like. A calibration circuit may further be include for processing at least some of defects introduced by sensor 516. Such a circuit would determine the image quality parameters and/or detect the presence of image quality defects and make adjustments. Such defects and parameters include, but are not limited to, lines, bands, streaks, mottle, and the like. Control system 560 may be placed in communication with system capable of performing Automated Image Quality Diagnostics (AIQD) techniques to aid in diagnostics. Such diagnostic tools collect and analyze data from the image itself and also from the printer's internal diagnostic systems. Using a combination of quantitative analysis and qualitative reasoning, the AIQD program then obtains a diagnosis and recommendation. Other image defect evaluation techniques may also be utilized for generating information such as, for example, tone reproduction curve correction models used to compensate for static defects.

It should be appreciated that any of the modules and processing units shown and described with respect to the block diagram of FIG. 5, and some or all of the functionality described for any of these modules may be performed, in whole or in part, within workstation 510 or by a special purpose computer system. It should be appreciated that various modules may designate one or more components which may, in turn, each comprise software and/or hardware designed to perform a specific function. A plurality of modules may collectively perform a single function. A module may have a specialized processor capable of reading machine executable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system or workstation, and may also be practiced in distributed computing environments where tasks are performed by remote processing devices that are linked through a communication network. In a distributed computing environment, program modules for performing various aspects of the present system and method. Other embodiments include a special purpose computer designed to perform the methods disclosed herein.

Example Special Purpose Computer System

Figure 6:
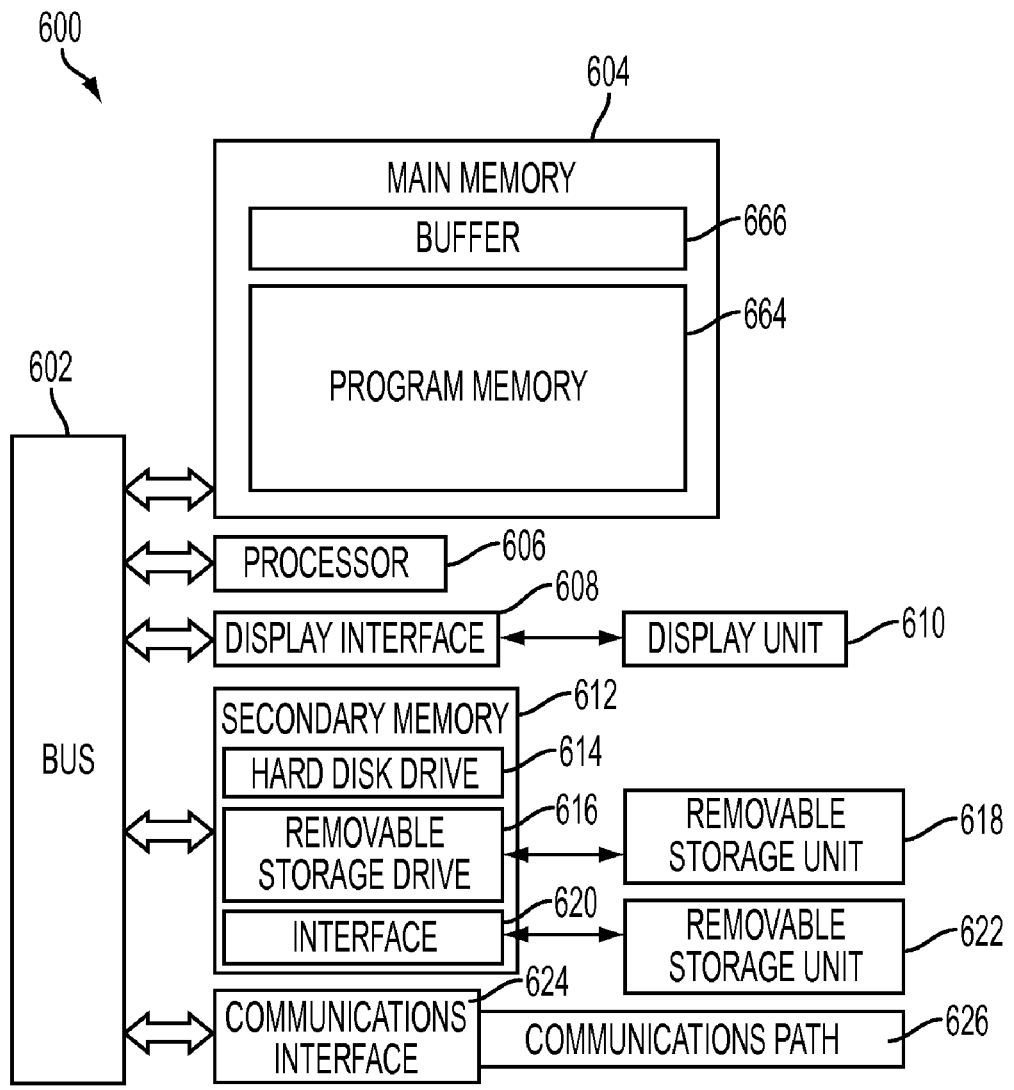
FIG. 6 is a block diagram of one example embodiment of a special purpose computer useful for implementing one or more aspects of the present method, as shown and discussed with respect to the above-described illustrations.

Reference is now being made to FIG. 6 which illustrates a block diagram of one example embodiment of a special purpose computer system for implementing one or more aspects of the present method as described with respect to the embodiments of the flow diagrams hereof and the block diagram of FIG. 5. Such a special purpose processor is capable of executing machine executable program instructions. The special purpose processor may comprise any of a micro-processor or micro-controller, an ASIC, an electronic circuit, or special purpose computer. Such a computer can be integrated, in whole or in part, with a xerographic system or a color management or image processing system, which includes a processor capable of executing machine readable program instructions for carrying out one or more aspects of the present method.

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned, and are intended to fall within the scope of the appended claims. All or portions of the flow diagrams may be implemented partially or fully in hardware in conjunction with machine executable instructions in communication with various components of such a system.

Special purpose computer system 600 includes processor 606 for executing machine executable program instructions for carrying out all or some of the present method. The processor is in communication with bus 602. The system includes main memory 604 for storing machine readable instructions. Main memory may comprise random access memory (RAM) to support reprogramming and flexible data storage. Buffer 666 stores data addressable by the processor. Program memory 664 stores machine readable instructions for performing the present method. A display interface 608 forwards data from bus 602 to display 610. Secondary memory 612 includes a hard disk 614 and storage device 616 capable of reading/writing to removable storage unit 618, such as a floppy disk, magnetic tape, optical disk, etc. Secondary memory 612 may further include other mechanisms for allowing programs and/or machine executable instructions to be loaded onto the processor. Such mechanisms may include, for example, a storage unit 622 adapted to exchange data through interface 620 which enables the transfer of software and data. The system includes a communications interface 624 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 626 which carries such signals and may be implemented using wire, cable, fiber optic, phone line, cellular link, RF, memory, or other means known in the arts.

The methods described can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine, that is in turn capable of implementing one or more elements of the flow diagrams provided herewith, or portions thereof, can be used. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for calibration of a marking device's output color as measured on a printed solid area patch, the method comprising:

for each of a desired color separation in an n-separation marking device having at least one actuator per color separation which regulates an amount of colorant deposited on a substrate at the solid area level, said actuator having been set to a nominal operating point:

selecting a target color parameter vector T at the solid area level comprising a point in color parameter space;

printing a solid area patch of said target color on a substrate using said marking device and measuring said printed patch to obtain a nominal measured color parameter vector N;

repeating for at least one iteration:

setting said actuator to a new operating point; and printing said solid area patch using said marking device and measuring said patch to obtain a measured color parameter vector associated with said new operating point;

determining a functional relationship between a predicted printed color parameter vector P and a corresponding actuator level using at least two of said measured color parameter vectors, said function relationship comprising a gradient $\vec{G}$ defined as a function of high and low actuator operation points $x_H$ and $x_L$, respectively, and color parameter vectors H and L, measured at said high and low actuator operating points $x_H$ and $x_L$, respectively;

using said gradient and said target color parameter vector T to determine a final actuator operating point for said marking device, said final operating point comprising an offset x from said nominal operating point, said offset defining a relationship between said gradient, said target color parameter vector T, and a point C between said color parameter vector L and H which minimizes a distance between said predicted printed color parameter vector and said target color parameter vector; and setting said actuator to said final actuator operating point.

2. The method of claim 1, wherein said steps of setting said actuator to a new operating point and printing said solid area patch, and said step of determining said functional relationship are performed in response to a distance between said nominal measured color parameter vector N and said target color parameter vector T being greater than a predefined threshold.

3. The method of claim 1, wherein upon having adjusted said actuator to said final operating point, further comprising:
   printing a solid area patch on a substrate using said marking device and measuring said printed patch to obtain a measured color parameter vector M;
   comparing said measured color parameter vector M to any of: said predicted printed color parameter vector P and said target color parameter vector T; and
   repeating said steps of setting said actuator to a new operating point and printing said solid area patch and said step of determining said functional relationship in response to a result of said comparison being outside a predetermined threshold.

4. The method of claim 1, wherein said gradient comprises:

$$\vec{G} = \left[\frac{(H-L)}{(x_H - x_L)}\right].$$

5. The method of claim 1, wherein said final operating point comprises:

$$x = \frac{\vec{G} \cdot (T-C)}{(\vec{G} \cdot \vec{G})},$$

where C is a point between said measured low color parameter vector L and said measured high color parameter vector H.

6. The method of claim 1, wherein any of: said color parameter vector H measured at said high actuator operating point $x_H$, and said color parameter L measured at said low actuator operating point, $x_L$, comprises said nominal measured color parameter vector N.

7. The method of claim 1, wherein said target color parameter vector T is measured using a reflectance sensing device.

8. The method of claim 1, wherein two functional relationships are determined, a first functional relationship based upon a predefined actuator operating point and a low actuator operating point, and a second functional relationship based upon a predefined actuator operating point and a high actuator operating point.

9. The method of Claim 1, wherein said functional relationship comprises a curve that passes through said color parameter vector measured at each of: a predefined actuator operating point, a low actuator operating point, and a high actuator operating point.

10. A system for calibrating a marking device's output color as measured at the solid area level, the system comprising:
   a memory;
   a storage medium for storing data; and
   a processor in communication with the storage medium and the memory, the processor executing machine readable program instructions for performing the method of:
      for each of a desired color separation in: an n-separation marking device having at least one adjustable actuator per color separation which regulates an amount of colorant deposited on a substrate at the solid area level, said actuator having been set to a nominal operating point:

selecting a target color parameter vector T at the solid area level comprising a point in color parameter space;
      printing a solid area patch of said target color on a substrate using said marking device and measuring said printed patch to obtain a nominal measured color parameter vector N;
      repeating for at least one iteration:
         setting said actuator to a new operating point; and
         printing said solid area patch using said marking device and measuring said patch to obtain a measured color parameter vector associated with said new operating point;
      determining a functional relationship between a predicted printed color parameter vector P and a corresponding actuator level using at feast two of said measured color parameter vectors, said function relationship comprising a gradient $\vec{G}$ defined as a function of high and low actuator operation points $x_H$ and $x_L$, respectively, and color parameter vectors H and L, measured at said high and low actuator operating points $x_H$ and $x_L$, respectively;
      using said gradient and said target color parameter vector T to determine a final actuator operating point for said marking device, said final operating point comprising an offset x from said nominal operating point, said offset defining a relationship between said gradient, said target color parameter vector T, and a point C between said color parameter vector L and H which minimizes a distance between said predicted printed color parameter vector and said target color parameter vector; and
      setting said actuator to said final operating point.

11. The system of claim 10, wherein said steps of setting said actuator to a new operating point and printing said solid area patch, and said step of determining said functional relationship are performed in response to a distance between said nominal measured color parameter vector N and said target color parameter vector T being greater than a predefined threshold.

12. The system of claim 10, wherein upon having adjusted said actuator to said final operating point, further comprising:
   printing a solid area patch on a substrate using said marking device and measuring said printed patch to obtain a measured color parameter vector M;
   comparing said measured color parameter vector M to any of: said predicted printed color parameter vector P and said target color parameter vector T; and
   repeating said steps of setting said actuator to a new operating point and printing said solid area patch and said step of determining said functional relationship in response to a result of said comparison being outside a predetermined threshold.

13. The system of Claim 10, wherein said gradient comprises:

$$\vec{G} = \left[\frac{(H-L)}{(x_H - x_L)}\right].$$

14. The system of claim 10, wherein said final operating point comprises:

$$x = \frac{\vec{G} \cdot (T - C)}{(\vec{G} \cdot \vec{G})},$$

where G is a point between said measured low color parameter vector L and said measured high color parameter vector H.

15. The system of Claim 10, wherein any of: said color parameter vector H measured at said high actuator operating point $x_H$, and said color parameter L measured at said low actuator operating point $x_L$, comprises said nominal measured color para meter vector N.

16. The system of claim 10, wherein said target color parameter vector T is measured using a reflectance sensing device.

17. The system of claim 10, wherein two functional relationships are determined, a first functional relationship based upon a predefined actuator operating point and a low actuator operating point, and a second functional relationship based upon a predefined actuator operating point and a high actuator operating point.

18. The system of claim 10, wherein said functional relationship comprises a curve that passes through said color parameter vector measured at each of: a predefined actuator operating point, a low actuator operating point, and a high actuator operating point.

19. A computer implemented method for calibration of a marking device's output color as measured on a printed solid area patch, the method comprising:
 for each of a desired color separation in an n-separation marking device having at least one adjustable actuator per color separation which regulates an amount of colorant deposited on a substrate at the solid area level, said actuator having been set to a nominal operating point:
  selecting a target color parameter vector T at the solid area level comprising a point in color parameter space;
  printing a solid area patch of said target color on a substrate using said marking device and measuring said printed patch using a reflectance sensing device to obtain a nominal measured color parameter vector N;
  repeating for at least one iteration:
   setting said actuator to a new operating point; and
   printing said solid area patch using said marking device and measuring said patch to obtain a measured color parameter vector associated with said new operating point;
 calculating a gradient comprising:

$$\vec{G} = \left[ \frac{(H - L)}{(x_H - x_L)} \right],$$

where $x_H$ is a high actuator operating point, $x_L$ is a low actuator operating point, H is a color parameter vector measured at said high actuator operating point, and L is a color parameter vector measured at said low actuator operating point;
 determining a final operating point as an offset from said nominal operating point, said offset comprising:

$$x = \frac{\vec{G} \cdot (T - C)}{(\vec{G} \cdot \vec{G})},$$

where C is a point between said measured low color parameter vector and said measured high color parameter vector; and
 setting said actuator to said final operating point.

20. The computer implemented method of claim 19, wherein said steps of setting said actuator to a new operating point and printing said solid area patch, and said step of determining said functional relationship are performed in response to a distance between said normal measured color parameter vector N and said target color parameter vector T being greater than a predefined threshold.

21. The computer implemented method of claim 19, wherein upon having adjusted said actuator to said final operating point, further comprising:
 printing a solid area patch on a substrate using said marking device and measuring said printed patch to obtain a measured color parameter vector M;
 comparing said measured color parameter vector M to any of: said predicted printed color parameter vector P and said target color parameter vector T; and
 repeating said steps of setting said actuator to a new operating point and printing said solid area patch and said step of determining said functional relationship in response to a result of said comparison being outside a predetermined: threshold.

22. The computer implemented method of claim 19, wherein any of said color parameter vector H measured at said high actuator operating point $x_H$, and said color parameter L measured at said low actuator operating point, $x_L$, comprises said nominal measured color parameter vector.

23. The computer implemented method of claim 19, further comprising:
 determining a first functional relationship based upon a predefined actuator operating point and a low actuator operating point, and a second functional relationship based upon a predefined actuator operating point and a high actuator operating point; and
 using said first and second functional relationships to determine said final operating point.

24. The computer implemented method of claim 19, wherein said functional relationship comprises a curve that passes through said color parameter vector measured at each of: a predefined actuator operating point, a low actuator operating point, and a high actuator operating point.

\* \* \* \* \*